(No Model.)

A. HIRSHHEIMER.
HARROW.

No. 325,541. Patented Sept. 1, 1885.

Witnesses:
P. W. Fowler,
H. B. Applewhaite,

Inventor;
Albert Hirshheimer
per attys.
A. H. Evans & Co.

UNITED STATES PATENT OFFICE.

ALBERT HIRSHHEIMER, OF LA CROSSE, WISCONSIN.

HARROW.

SPECIFICATION forming part of Letters Patent No. 325,541, dated September 1, 1885

Application filed February 27, 1885. (No model.)

*To all whom it may concern:*

Be it known that I, ALBERT HIRSHHEIMER, a citizen of the United States, residing at La Crosse, in the county of La Crosse and State of Wisconsin, have invented certain new and useful Improvements in Harrows, of which the following is a full, clear, and exact description, reference being had to the accompanying drawings, forming part of this specification, in which—

Figure 1:
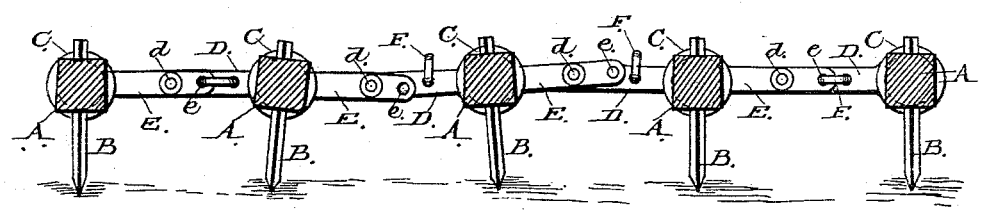
Figure 2:
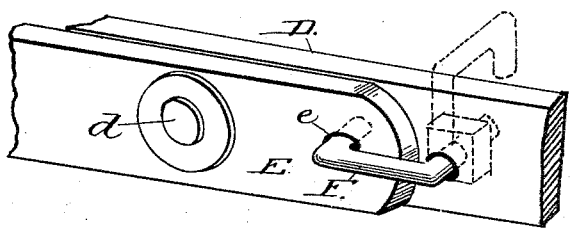
Figure 3:
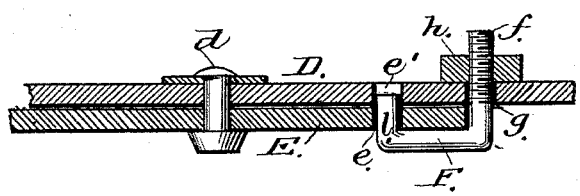

Figure 1 represents a longitudinal sectional view of a harrow with my improvements attached, showing part of the same rigid and part flexible. Figs. 2 and 3 are enlarged views of my improvement.

My invention relates to harrows adapted for use on both smooth and uneven ground; and it consists in the combination of devices hereinafter described and claimed.

To enable others skilled in the art to make and use my improvements, I will now proceed to describe the exact manner in which I have carried it out.

The present invention is an improvement on Letters Patent No. 305,592, granted to me September 23, 1884; and to make my improvements more manifest I have found it necessary to illustrate certain portions of the harrow shown and described in said patent, as these improvements, although adapted to many of the harrows now in use, are especially adapted to the form therein shown.

In the said drawings, A represents the beams of the harrow, and B the teeth constructed in any well-known manner. The end of each beam is preferably rounded and fitted with a metallic band, C, in which the end of the beam turns, while the bands fitting the ends of the beam guard against the possibility of these splitting when striking against stones, grubs, or other obstructions.

On opposite sides of the bands, and as shown in Fig. 1 forming a part thereof, are the links D and E, pivoted together at $d$, as shown. The link E has a perforation, $e$, near its outer end, while the link D is also perforated at $e'$, so that when the links are brought together to form a rigid harrow, these perforations $e$ and $e'$ are in direct alignment with each other.

At $g$ the link D has another perforation, through which passes a locking-bolt of peculiar construction. This locking-bolt, which is designated by the letter F, is preferably L-shaped, the long end $f$, being threaded, passes through the perforation $g$ and engages an adjusting-nut, $h$, while the short arm $l$ passes through the perforations $e$ and $e'$ in the links D and E, respectively, and securely hold these links when it is desired to have a rigid harrow.

It will be readily seen by reference to the drawings that in unscrewing the nut $h$ and passing the short arm $l$ over the end of the link E and through the perforations $e$ and $e'$, all flexibility of the harrow-frame is destroyed. When it is desired to convert this rigid frame into a flexible one the operator simply unscrews the nut $h$ sufficiently far to allow the arm $l$ to come out of the perforation, and to be swung around until it is out of the way, or it may be passed over the edge of the link D when the nut is screwed up to retain it in this position, and thus make it almost impossible for it to be caught by the links in vibrating up and down. This is an important feature over the head and slot shown and described in my former patent, as they have to be screwed together very tightly, because if this were not done the continued movement of the links, when a flexible harrow is used, would cause these parts to work loose, the head often sliding in the slot far enough to be caught by the ends of the links, and thus destroy the flexibility of the harrow, or they may be twisted or otherwise unfitted for use.

Having thus described my invention, what I claim as new, and desire to secure by Letters Patent, is—

1. In a convertible rigid or flexible harrow, the combination, with the pivoted and perforated links D and E, of an L-shaped locking-bolt adapted to engage the perforations in said links, and an adjusting-nut, whereby the locking-bolt is held into or out of engagement with the links, substantially as described.

2. In a convertible rigid or flexible harrow, the link D, provided with the perforations $g$ and $e'$, in combination with the link E pivoted to the link D, and provided with a perforation, $e$, an L-shaped locking-bolt, F, and an adjusting-nut, $h$, whereby the arm $l$ of the locking-bolt is held into or out of engagement with the perforations $e$ and $e'$, substantially as and for the purpose herein described.

ALBERT HIRSHHEIMER.

Witnesses:
SARA L. FOX,
ANGUS SCOTT.